United States Patent [19]

Kawai et al.

[11] 4,271,469

[45] Jun. 2, 1981

[54] METHOD FOR DETECTING KNOCKING IN INTERNAL COMBUSTION ENGINE

[75] Inventors: Hisasi Kawai, Toyohashi; Toshimitsu Ito, Toyota; Masakatsu Sanada, Susono; Kazuo Iwase, Okazaki, all of Japan

[73] Assignees: Nippon Soken, Inc., Nishio; Toyota Jidosha Kogyo Kabushiki Kaisha, Toyota, both of Japan

[21] Appl. No.: 24,772

[22] Filed: Mar. 28, 1979

[30] Foreign Application Priority Data

Apr. 24, 1978 [JP] Japan .................................. 53/49095

[51] Int. Cl.³ ...................... G06F 15/20; G01M 15/00
[52] U.S. Cl. ................................... 364/431; 364/511; 73/117.3
[58] Field of Search .............. 364/431, 506, 511, 508; 73/117.2, 117.3

[56] References Cited

U.S. PATENT DOCUMENTS

| | | | |
|---|---|---|---|
| 3,972,230 | 8/1976 | Hanson et al. | 364/431 X |
| 4,009,378 | 2/1977 | Sakamoto | 364/431 |
| 4,009,699 | 3/1977 | Hetzler et al. | 364/511 X |
| 4,044,234 | 8/1977 | Frobenius et al. | 364/431 |
| 4,044,236 | 8/1977 | Bianchi et al. | 364/431 |
| 4,055,995 | 11/1977 | Armstrong et al. | 364/511 X |
| 4,060,714 | 11/1977 | Lappington et al. | 364/431 |

*Primary Examiner*—Edward J. Wise
*Attorney, Agent, or Firm*—Cushman, Darby & Cushman

[57] ABSTRACT

A knocking detection method for internal combustion engines in which vibrations of the engine are detected by a vibration sensor and a peak value of the vibrations during a predetermined interval near the top dead center in each revolution of the engine is sampled. The peak value for each revolution is stored for a predetermined number of revolutions of the engine and an average value of the peak values is obtained. Then the ratio of each peak value to the average value is calculated, and the number of ratios whose magnitude exceeds a predetermined magnitude is expressed in terms of a rate or a percentage with respect to the total number of ratios, i.e., the predetermined number of revolutions of the engine. The presence or absence of the knocking is determined whether or not the rate or percentage is above a reference rate or percentage.

4 Claims, 21 Drawing Figures

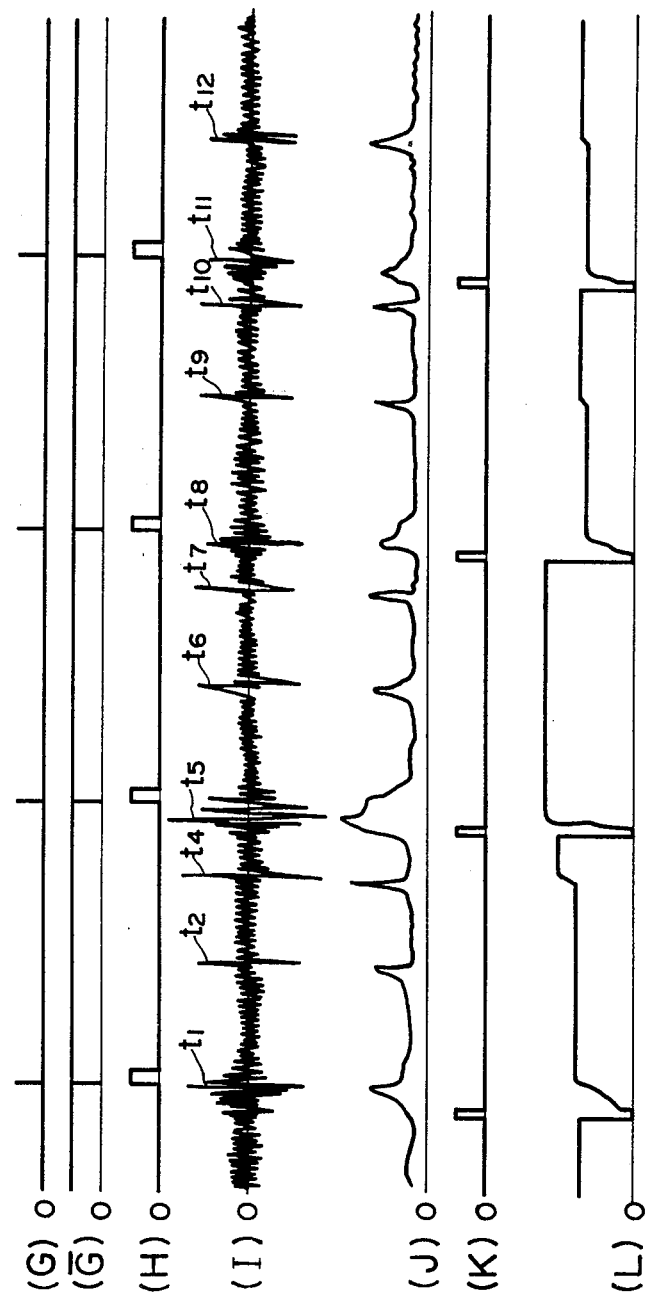

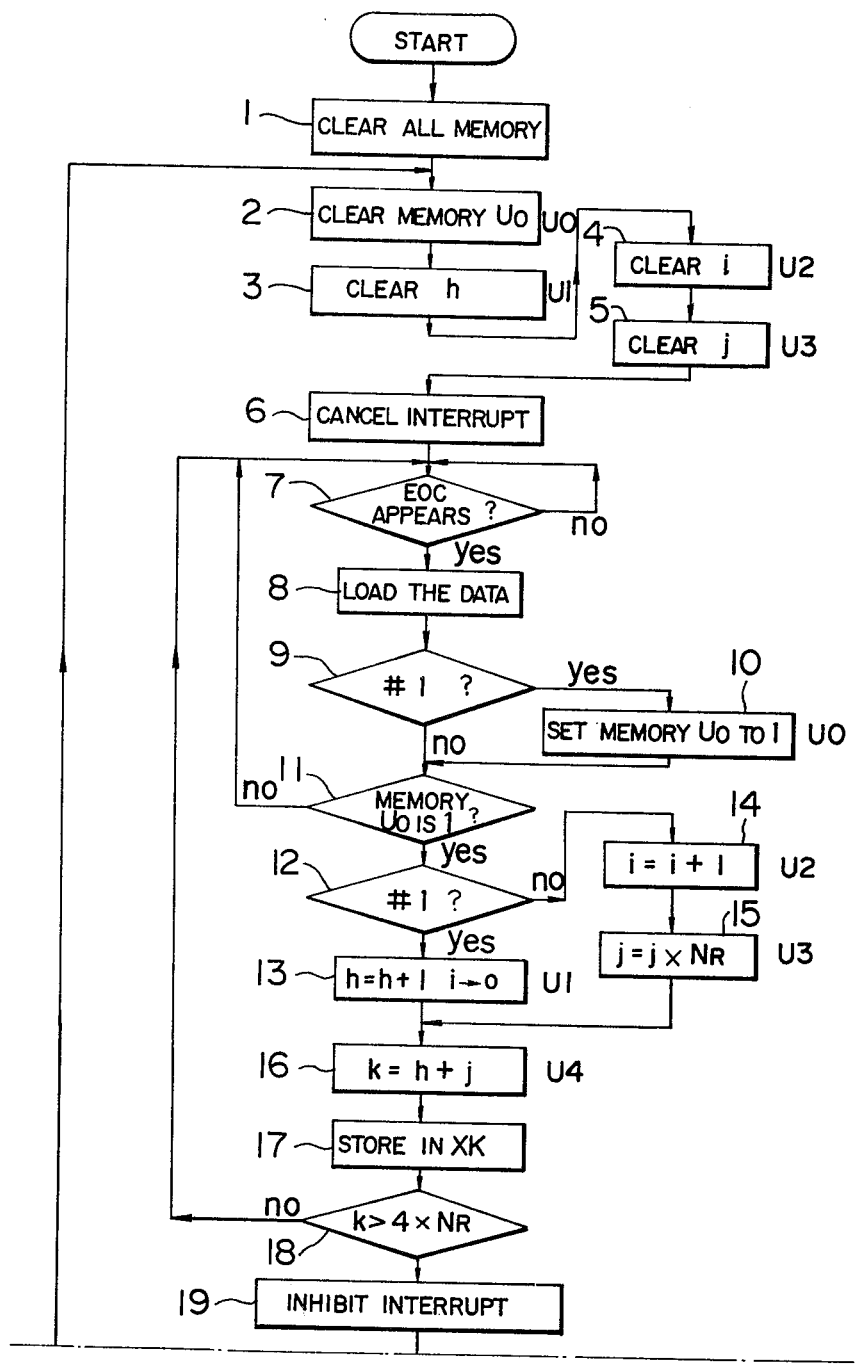

METHOD FOR DETECTING KNOCKING IN INTERNAL COMBUSTION ENGINE

BACKGROUND OF THE INVENTION

1. Field of the Invention

The present invention relates to a method and apparatus for detecting the presence or absence of knocking in internal combustion engines.

2. Description of the Prior Art

In the past, various kinds of knocking detection apparatus have been designed in which vibration sounds, mechanical vibration acceleration, or combustion internal pressure vibrations in the internal combustion engine are detected and the presence or absence of knocking is determined based on output signals indicative of these phenomena. However, such apparatus is not necessarily satisfactory in accurately detecting the presence or absence of knocking with a small error due to secular changes.

SUMMARY OF THE INVENTION

It is, therefore, an object of the present invention to provide a method and apparatus for detecting the presence or absence of knocking for internal combustion engines statistically accurately.

It is another object of the present invention to provide a method and apparatus for detecting the presence or absence of knocking for each cylinder individually in a multicylinder internal combustion engine.

According to one aspect of the present invention, vibrations caused by the combustion phenomenon in the internal combustion engine are detected, and among the detected signals, those outputs falling within a predetermined range near the top dead center are extracted followed by an A-D conversion of the extracted outputs. Then, the A-D converted outputs are stored for a period of a predetermined number of rotations, and the mean value of the stored values is obtained. Then the ratios between the A-D converted values and the mean value are obtained. When a rate in which the ratios are above a predetermined value is equal to or above a predetermined value, it is determined that the knocking is occurring and an output indicative thereof is delivered. As a result, there is the advantage that the detection of the knocking is statistically accurately achieved without being affected by engine speed, loads, secular change and noise.

Furthermore, according to another aspect of this invention, combustion internal pressure vibrations in each cylinder of the internal combustion engine are further detected, and among the combustion internal pressure vibrations of the respective cylinders, those frequency outputs which are above several KHz are picked up to detect knocking vibrations. Thus, there is the advantage that, the presence or absence of the knocking can be detected for each cylinder.

DETAILED DESCRIPTION OF THE PREFERRED EMBODIMENTS

Figure 1:
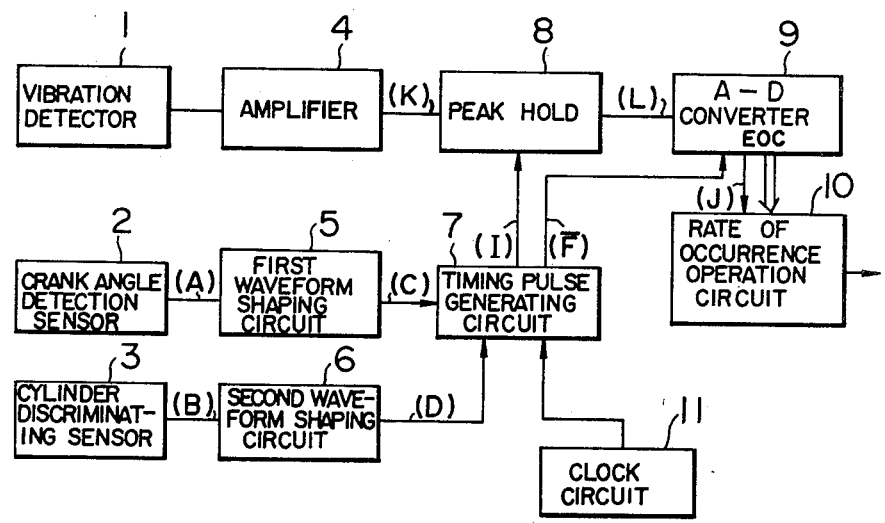
FIG. 1 is a block diagram showing a first embodiment of a knocking detection apparatus for internal combustion engines according to this invention.

The present invention will be described as to the embodiments as shown in the drawings.

FIG. 1 illustrates a first embodiment in which the present invention is applied to a four in-line cylinder internal combustion engine.

Figure 2:
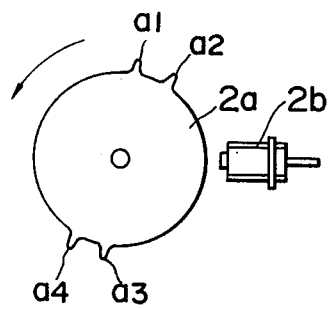
FIG. 2 is a schematic diagram showing a crank angle detection sensor used in the apparatus of FIG. 1.

In FIG. 1, numeral 1 designates a vibration detector commercially available and using a piezoelectric element, and it is mounted on the engine block (not shown). The vibration detector 1 generates an analog signal proportional to the vibration acceleration by detecting the mechanical vibration acceleration of the engine block. 2 is a crank angle detection sensor and the construction thereof is shown in FIG. 2. In FIG. 2, 2a is an iron disc mounted on a crankshaft and having four projections a1, a2, a3 and a4 around it, and the projection a1 is located at 10° (ten degrees) after the top dead center of the first and fourth cylinders. The projection a2 is located at 30° after the top dead center of the first and fourth cylinders. The projection a3 is located at 10° after the top dead center of the second and third cylinders. The projection a4 is located at 30° after the top dead center of the third and second cylinders. 2b is an electromagnetic pickup and is a well-known sensor which produces a signal at the position against each projection on the iron disc 2a.

Figure 3:
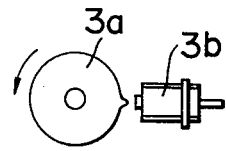
FIG. 3 is a schematic diagram showing a cylinder discrimination sensor used in the apparatus of FIG. 1.

Numeral 3 is a cylinder discriminating sensor and its construction is shown in FIG. 3 and it is contained in a distributer connected to a camshaft which rotates one time while the crankshaft rotates twice. In FIG. 3, 3a is an iron disc having one projection on it. 3b is an electromagnetic pickup identical with 2b shown in FIG. 2, and it produces a signal at the position against a projection on the disc 3a. The projection is positioned at about 20° before the top dead center of the first cylinder.

Numeral 4 is an amplifier and since it is well known no explanation will be needed. 5 is a first waveform shaping circuit and it shapes the waveform of an output signal from the pickup 2b.

Figure 5:
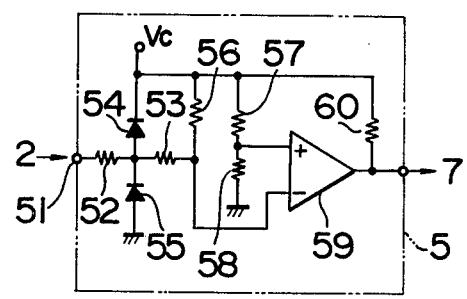
FIG. 5 is a circuit diagram of a first waveform shaping circuit used in the apparatus of FIG. 1.
Figure 4:
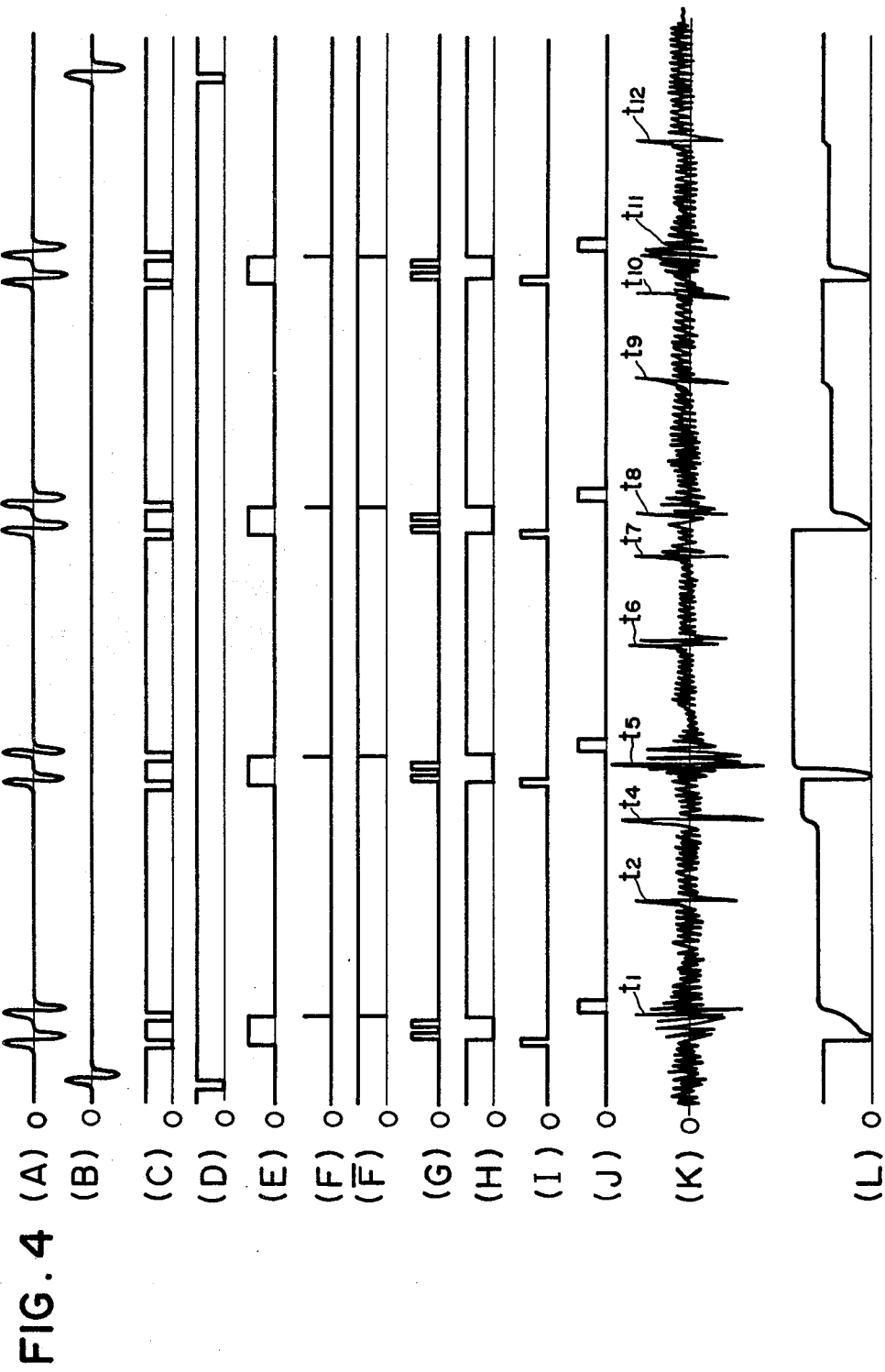
FIG. 4 is a diagram of waveforms for explaining the operation of the apparatus of FIG. 1.

The detailed circuit of the first waveform shaping circuit 5 is shown in FIG. 5. In FIG. 5, 51 is an input terminal and one end of a resister 52 is connected with the input terminal 51 and the other end is connected commonly with a resistor 53, a positive electrode of a diode 54 and a negative electrode of a diode 55. The other end of the resistor 53 is connected with an inverting input terminal of a comparator 59 consisting of a Motorola IC, No. 3302, and a positive electrode of the diode 55 is connected to ground. One end of a resistor 56 is connected with the other end of the resistor 53 and the other end is connected with a negative electrode of the diode 54. One end of a resistor 57 is connected with the negative electrode of the diode 54, and the other end is connected with one end of a resistor 58, the other end of the resistor 58 being connected to ground. The junction point of the resistors 57 and 58 is connected with a non-inverting input terminal of the comperator 59. Since the output of the comparator 59 is made an open-collector configuration, a resistor 60 is inserted between the output and a power supply Vc. And respective resistance values are determined so that an impedance from the non-inverting terminal of the comparator 59 toward the resistor side is equal to an impedance from the inverting terminal toward the resistor side. Furthermore, the non-inverting input terminal of comparator 59 is set at a voltage of about $\frac{1}{3}$ of Vc. Therefore, when the magnetic pickup 2b is connected with the input terminal 51, a voltage of about $\frac{1}{3}$ Vc is applied to the inverting input terminal. The diode 55 is used to prevent the inverting input terminal from being applied with a negative voltage less than $-0.5$ V, and the diode 54 is used to prevent the non-inverting terminal from being applied with a positive voltage above $+(Vc+0.5 V)$. Now, when the disc 2a rotates and every time the projections pass over the electromagnetic pickup 2b, waveforms shown in (A) of FIG. 4 are produced. Then, a shaping pulse as shown in (C) of FIG. 4 is generated at the output of the comparator 59.

A second waveform shaping circuit 6 has the same circuit arrangement as the first waveform shaping circuit 5, and hence explanation thereof will be omitted. Whenever, under the operation of the disc 3a, the projection passes over the electromagnetic pickup 3b, a waveform shown in (B) of FIG. 4 is generated, and accordingly a shaping pulse shown in (D) of FIG. 4 is generated at the output of the second waveform shaping circuit 6.

Figure 6:
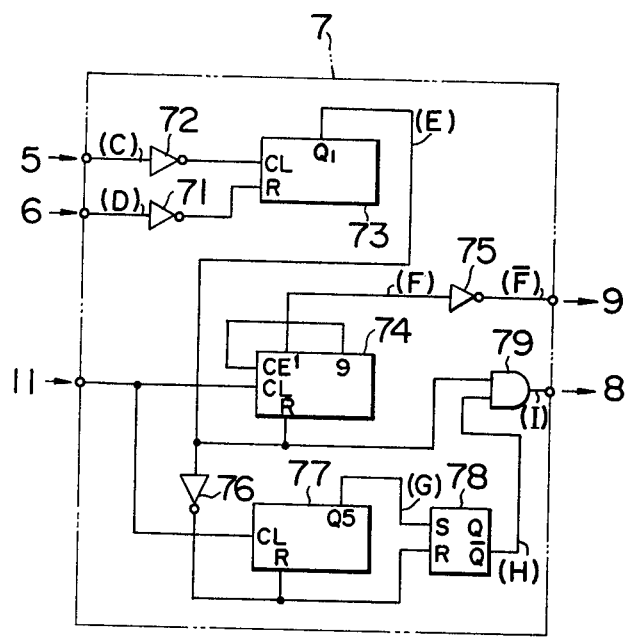
FIG. 6 is a circuit diagram of a timing pulse generating circuit used in the apparatus of FIG. 1.

Numeral 7 is a timing pulse generating circuit which generates, based on the signals from the cylinder discriminating sensor 3 and the crank angle detection sensor 2, a reset signal applied to a peak hold circuit 8 and a trigger signal for starting the A-D (analog-to-digital) conversion in an A-D converter circuit 9. The internal circuit is shown in FIG. 6. In FIG. 6, the input of an inverter 71 is connected with the output of the second waveform shaping circuit 6 and the output of the inverter 71 is connected with a reset terminal of a binary counter 73. The input of an inverter 72 is connected with the output of the first waveform shaping circuit 5 and the output of the inverter 72 is connected with a clock input of the binary counter 73. The output $Q_1$ of the counter 73 is connected to a reset terminal of a counter 74 having a divider and to the input of an inverter 76. A clock input CL of the counter 74 having a divider is connected with the output of a clock circuit 11. This counter 74 having a divider uses an RCA IC, CD4017. The output 9 is connected with a clock enable terminal CE. The output 1 is connected with the A-D converter 9 through an inverter 75. The output of the inverter 76 is connected to a reset input of a binary counter 77 and to a reset terminal of a flip-flop 78. A clock input CL of this binary counter 77 is applied with the output $C_1$ from the clock circuit 11. The output $Q_5$ is connected with a set terminal of an R-S flip-flop 78. One input of an AND gate 79 is connected with the $Q_1$ output of the counter 73 and the other input is connected with the $\overline{Q}$ output of the R-S flip-flip 78. The output of the AND gate 79 is connected with a reset terminal of the peak hold (sampling) circuit 8.

In operation of the timing pulse generating circuit 7, the pulse shown in (D) of FIG. 4 is inverted by the inverter 71 and applied to the reset terminal of the counter 73, and the pulse in (C) of FIG. 4 is inverted by the inverter 72 and applied to the clock input CL. Consequently, a waveform as shown in (E) of FIG. 4 is generated at the output $Q_1$ which delivers an $\frac{1}{2}$ frequency divided output of the input clock pulse. The counter 74 having a divider is reset by the pulse a shown in (E) of FIG. 4 and commences the counting when the pulse of (E) becomes "0" from "1". A clock signal having a frequency of 200 KHz is applied to the clock input CL of the counter 74. Therefore, when the first pulse is applied, a pulse is produced at the output 1. When the ninth pulse is applied, since the output 9 becomes "1" and the clock enable terminal CE becomes "1", the clock is inhibited from entering until the next resetting. As a result, at the output 1, a pulse shown in (F) of FIG. 4 is produced. This output pulse is used through the inverter 75 as a starting trigger pulse for the A-D converter 9. The trigger pulse is shown in (F) of FIG. 4. Then, the counter 77 is reset by a pulse resulting from the inversion of the pulse shown in (E) of FIG. 4 by the inverter 76. And, since the clock signal of 200 KHz is applied, a waveform as shown in (G) of FIG. 4 is produced at the $Q_5$ output at which an 1/32 frequency division of the input clock pulse is effected. Since the R-S flip-flop 78 is reset by a reset signal from the counter 77, and is set by the output signal from the $Q_5$ output of the counter 77, the $\overline{Q}$ output assumes a waveform as shown in (H) of FIG. 4. Therefore, the output of the AND gate 79 which produces the AND of the waveforms of (E) and (H) of FIG. 4 assumes a waveform as shown in (I) of FIG. 4. This output pulse is used as a reset signal of the peak hold (sampling) circuit 8.

Figure 7:
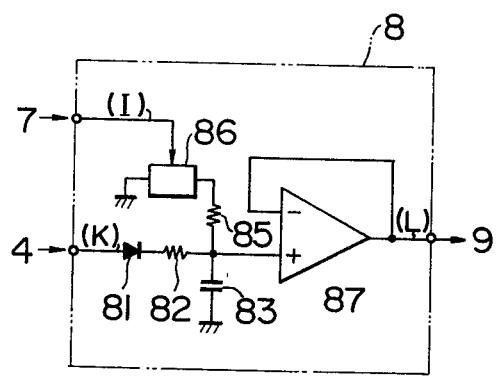
FIG. 7 is a circuit diagram of a peak hold circuit used in the apparatus of FIG. 1.

FIG. 7 illustrates the internal circuit of the peak hold circuit 8. In FIG. 7, the positive electrode of diode 81 is connected with the output of the amplifier 4 and the negative electrode is connected with one end of a resistor 82. The other end of the resistor 82 is connected with the positive electrode of a capacitor 83, the non-inverting input of a buffer amplifier 87 and a resistor 85. The negative electrode of the capacitor 83 is connected with ground. The other end of the resistor 85 is connected with one end of an analog switch 86. The other end of the analog switch 86 is connected with ground, and the control terminal is connected to receive an (I)

signal from the timing pulse generating circuit 7. The inverting input of the buffer amplifier 87 is connected with the output thereof.

In operation of the peak hold circuit 8, when the pulse shown in (I) of FIG. 4 is applied to the control input of the analog switch 86 from the timing pulse generating circuit 7, the analog switch 86 is kept closed during the pulse width, thus, the electric charge of the capacitor 83 is discharged through the resistor 85 of a low resistance value, and a voltage of the capacitor 83 is reset to 0 V (zero volt). Thereafter, when the output waveform of the amplifier 4 shown in (K) of FIG. 4 enters from the positive electrode of the diode 81, the capacitor 83 is charged through the diode 81 and the resistor 82. The voltage of the capacitor 83 holds a positive peak value from the resetting thereof until the next resetting. When the voltage of this capacitor 83 is delivered through the buffer amplifier 87 having a high input impedance, a waveform of the output will be as shown in (L) of FIG. 4. The A-D converter 9 employs a Micronetwork Co., A-D converter IC, No. MN5120. When the output signal shown in ($\overline{F}$) of FIG. 4 is fed to a start conversion terminal of the A-D converter 9 from the timing pulse generating circuit 7, it begins the conversion, and when the conversion is completed, a pulse shown in (J) of FIG. 4 is generated at EOC (end of conversion) terminal. The conversion time is about 10 $\mu$sec. Since the signal of ($\overline{F}$) in FIG. 4 represents a waveform produced at 30° after the top dead centre (TDC) of each cylinder, and since the voltage of the peak hold circuit 8 is subject to the A-D conversion from the occurrence of the waveform until the lapse of 10 $\mu$sec., the output value of 8 bit binary code of the A-D converter 9 is substantially indicative of the peak value of the vibration signal waveform in the range of 10° to 30° after the TDC of each cylinder. The EOC output of this A-D converter 9 is connected with the trap (interrupt) terminal of a rate of occurrence operation circuit 10, and the 8 bit binary code output is connected with the I/O terminal respectively.

Now, consideration will be given as to the vibration waveform of the engine block, that is, the waveform of (K) in FIG. 4. A vibration waveform $t_1$ is generated by an explosion in the first cylinder, $t_5$ is for the third cylinder, $t_8$ is for the fourth cylinder, and a waveform $t_{11}$ is caused by an explosion in the second cylinder. Waveforms $t_2$, $t_6$, $t_9$ and $t_{12}$ are generated by opening the intake valves and exhaust valves in each cylinder. A waveform $t_4$ represents ignition noise in the third cylinder, $t_7$ represents ignition noise in the fourth cylinder, and $t_{10}$ represents ignition noise in the second cylinder. These ignition noise spikes appear at the output of the buffer amplifier 4 as electric signals. However, the signal desired to be picked up in a peak voltage signal which occurs in the range of 10°~30° after the T.D.C. If, as in this invention, the peak hold circuit 8 is reset at 10° after the T.D.C, and the A-D conversion is performed in the A-D converter 9 at 30° after the T.D.C. and the data therefrom is held in the rate of occurrence operation circuit 10 subsequently, undesired signals such as ignition noise, signals generated by switching the valves and the like can be eliminated. Thus, a sampling A-D conversion circuit is constituted by the peak hold circuit 8 and the A-D converter 9.

Figure 8:
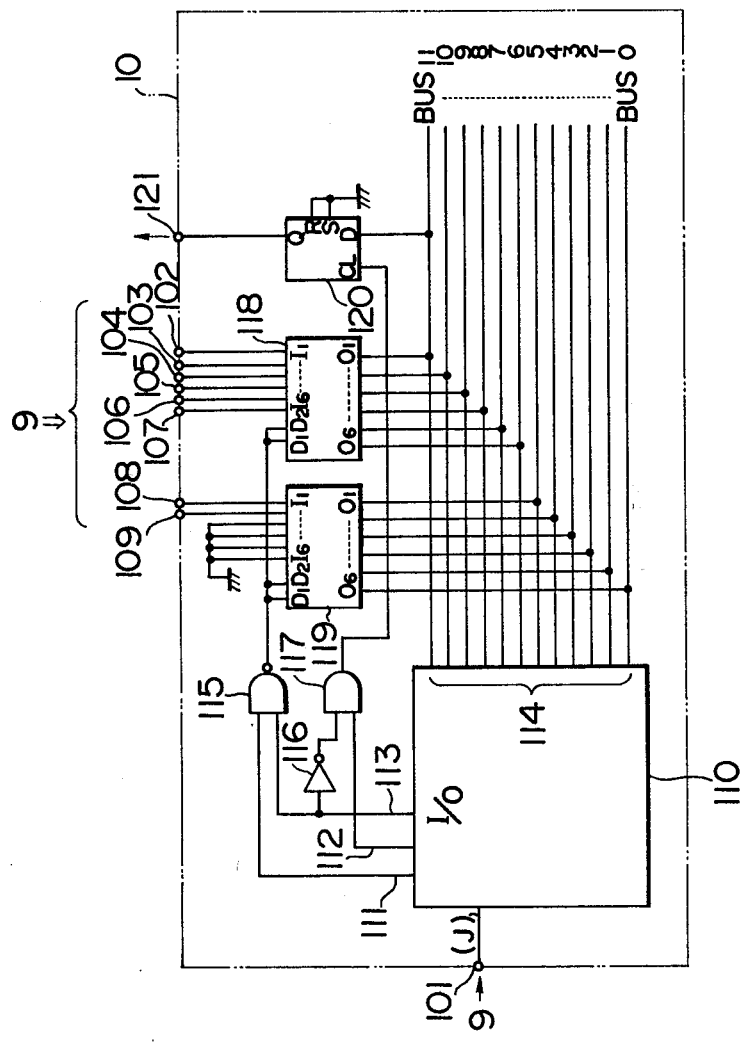
FIG. 8 is a circuit diagram of a rate of occurrence operation circuit used in the apparatus of FIG. 1.

An explanation will be given as to the rate of occurrence operation circuit 10. The internal circuitry of the rate of occurrence operation circuit 10 is shown in FIG. 8. An input terminal 101 is connected with the output EOC terminal of the above-mentioned A-D converter 9. Furthermore, input terminals 102, 103, 104, 105, 106, 107, 108, and 109 are connected with the 8 bit binary code outputs of the A-D convertor 9 respectively in the order of digit number from smaller to larger. 110 is a microcomputer and uses a Toshiba TLCS-12. The circuitry and operation of this microcomputer are well known and hence explanation thereof is omitted. However, it employs an internally provided clock frequency (2 MHz) and when power is applied thereto, it initializes and commences operation starting from a designated address of ROM. One of eight interrupt signal lines of this microcomputer 110 is connected with the input terminal 101. Also, the terminal 111 is connected with one of sixteen device-address-select-signal lines of an internally provided input/output control unit (hereinafter referred to as a D.C.U) of the microcomputer 110 to couple the device with the BUS line. This terminal 111 is connected with one terminal of a NAND gate 115. Also, the terminal 112 is connected with one of the rest of the fifteen device-address-select-signal lines. The terminal 113 serves as an input/output command line of the D.C.U. and when the terminal is at "1" level, the data is transferred from the device to a processor (hereinafter referred to as a C.P.U) within the microcomputer 110, whereas at "0" level the data is transferred from the C.P.U to the device. The terminal 113 is connected with the other terminal of the NAND gate 115, as well as with the other terminal of a NAND gate 117 through an inverter 116. 114 is a 12 bit bus and includes twelve BUS lines. The BUS 11 corresponds to the least significant digit and BUS 0 to the most significant digit. 118 is a buffer circuit and consists of six circuits of 3 state non-inverting buffers and uses a Toshiba, No. TC5012P. Inputs $I_1$, $I_2$, $I_3$, $I_4$, $I_5$ and $I_6$ are connected with the input terminals 102, 103, 104, 105, 106 and 107 of the rate of occurrence operation circuit 10 in this order respectively.

Disable terminals $D_1$ and $D_2$ are connected commonly with the output of the NAND gate 115. Also, outputs $O_1$, $O_2$, $O_3$, $O_4$, $O_5$ and $O_6$ are connected to the BUS lines; BUS11, BUS10, BUS9, BUS8, BUS7, BUS6 respectively in this order. 119 uses the same TC5012P as the buffer 118. Inputs $I_1$ and $I_2$ are connected with the input terminals 108 and 109 of the rate of occurrence operation circuit 10 in this order respectively. Also, the rest inputs $I_3$, $I_4$, $I_5$ and $I_6$ are connected to ground commonly. Disable terminals $D_1$ and $D_2$ are together connected with the output of the NAND gate 115. Also, outputs $O_1$, $O_2$, $O_3$, $O_4$, $O_5$ and $O_6$ are connected with the BUS lines; BUS5, BUS4, BUS3, BUS2, BUS1 and BUS0 in this order respectively. 120 is a flip-flop and the 10 clock input CL is connected with the output of the AND gate 117, and the D input is connected with the BUS line 11, and set and reset terminals are connected to ground together. The output of this flip-flop 120 is connected with the output terminal 121 of the rate of occurrence operation circuit 10.

The operation of the rate of occurrence operation circuit 10 having the construction explained above will be described referring to a flowchart of FIG. 9. The power supply is applied by turning ON a key switch (not shown) and the circuit starts its operation. All memories are cleared in step 1 and results in 0. A master mask is set in step 2 so that the EOC output (interrupt signal) of the A-D converter 9 is allowed to enter. The content h of $U_1$ in a memory area U is cleared in step 3. As soon as the engine starts and rotates, the A-D converter 9 begins conversion by a pulse ($\bar{F}$) in FIG. 4 applied from the timing pulse generating circuit 7. When this conversion finishes, an EOC pulse in (J) of FIG. 4 is generated and it is applied to the input terminal 101 of the rate of occurrence operation circuit 10 to effect interruption in the microcomputer 110 and to start operation. This is achieved in step 4. If the EOC pulse does not appear, it waits until it is fed. Whereas when the EOC pulse enters, the step proceeds to step 5. In step 5, after loading the data from the I/O on h of the address Xh in a memory area X designated by the content h of the memory $U_1$, the data is stored in the memory. Accordingly, at the beginning, the data $D_o$ which has been A-D converted is stored in the memory $X_o$. In step 6, "1" is added to the value of the memory $U_1$, and the added value h is stored in the memory $U_1$. In step 7, it discriminates whether or not this added value h is above a set value $N_R$. If it is "yes", it proceeds to step 8. If it is "No", it returns to step 4. In this manner, in the process of steps 3, 4, 5, 6 and 7, as many as $N_R$ pieces of data produced by the A-D converter are fed. In step 8, the master mask is reset to inhibit the entry of an interrupt signal. In step 9, the content h of the memory $U_1$ is cleared. In step 10, among the data stored in the memories $X_o, X_1 \ldots X_{nR-1}$, the added value $$\sum_{h=0}^{h} Dh$$

up to the address h designated by the memory $U_1$ is added to the data $D_{h+1}$ of the address (h+1), and then proceeds to step 11, In step 11, "1" is added to the content h of the memory $U_1$ and the result is stored in the memory $U_1$. Step 12 discriminates whether the value h of this $U_1$ is above the set value $N_R$ or not, and if it is "Yes", the process proceeds to step 13, and if it is "No", the process returns to step 10. As described above, by the steps 9, 10, 11 and 12, it results in that all the $N_R$ pieces of data including $D_o, D_1, D_2 \ldots D_{nr-1}$ produced by the A-D converter 9 have been added together. In step 13, a mean value $\overline{D}$ is obtained by dividing this added value Dh by the set value $N_R$ (the number of data). Step 14 clears the content p of the memory $U_2$, and step 15 clears the content q of memory $U_3$. In step 16, the data $D_p$ stored in the memory $X_p$ is divided by the mean value $\overline{D}$, and in step 17 it is discriminated whether this divided value $E_p$ is below the set value $E_R$ or not. If it is "Yes", the process proceeds to step 18, and if it is "No", in step 19, "1" is added to the content of the memory $U_3$ and the result is stored in the memory $U_3$. In the step 18, "1" is added to the content of the memory $U_2$ and the result is stored in memory $U_2$. In step 20, it is discriminated whether the content p of the memory $U_2$ is above the set value $N_R$ and if it is "Yes"the process proceeds to step 21, whereas if it is "No", the process returns to step 16. As described above, in the steps 16, 17, 18, 19, and 20, the divisions such as $D_o/\overline{D}, D_1/\overline{D}, \ldots D_{NR-1}/\overline{D}$ are performed respectively, and it is indicated that the number of the divided values which exceed the set value $E_R$ is q. In step 21, the content q of the memory $U_3$ is divided by the set value $N_R$ to obtain a value F, and in step 22, a value H is obtained by multiplying "100" by this value F. Steps 21 and 22 are the processes for converting the above value into the percentage. In step 23 it is discriminated whether the obtained value H is above a set value $H_R$ or not and if it is "Yes" the process proceeds to step 24, whereas if it is "No", proceeds to step 25. In the step 24, "1" which indicates that the rate of knocking occurrence is high is stored in the memory $U_4$, and in the step 25, "0" which indicates that the rate of knocking occurrence is low is stored in the memory $U_4$. In step 26, the content of the memory $U_4$ is delivered to the I/O, and the process returns to step 2.

The inputting and outputting of the data to and from the microcomputer 110 will be explained. Upon receiving the EOC pulse, an input/output command signal 113 becomes "1" level in the step 5, and thereafter a device-address-selection signal is produced at terminal 111. When both the input/output command signal and the device-address-selection signal are "1" level the NAND gate 115 becomes "0" level, and thus couples the inputs and outputs of the buffers 118 and 119, thereby to store the data Dh of the input terminals 102, 103, 104, 105, 106, 107, 108 and 109 in the memory of the microcomputer 110 through the BUS lines.

Next, in the case of outputting the operation results to the I/O, the terminal 112 becomes "1" level by a signal selecting a device of the device-address-selection signal. Then, when the input/output command line 113 becomes "0" level, the data is transferred to the device from the CPU of the microcomputer 110. Thus, when both the inverted input/output command signal inverted by the inverted 116 and the device-address-selection-signal are "1" level, a pulse which changes from "0" to "1" is applied to the clock input of D type flip-flop 120, and a value delivered to the bus line BUS11 is stored. As a result, the output is delivered at the output 121 of the rate of occurrence operation circuit 10.

Figure 9:
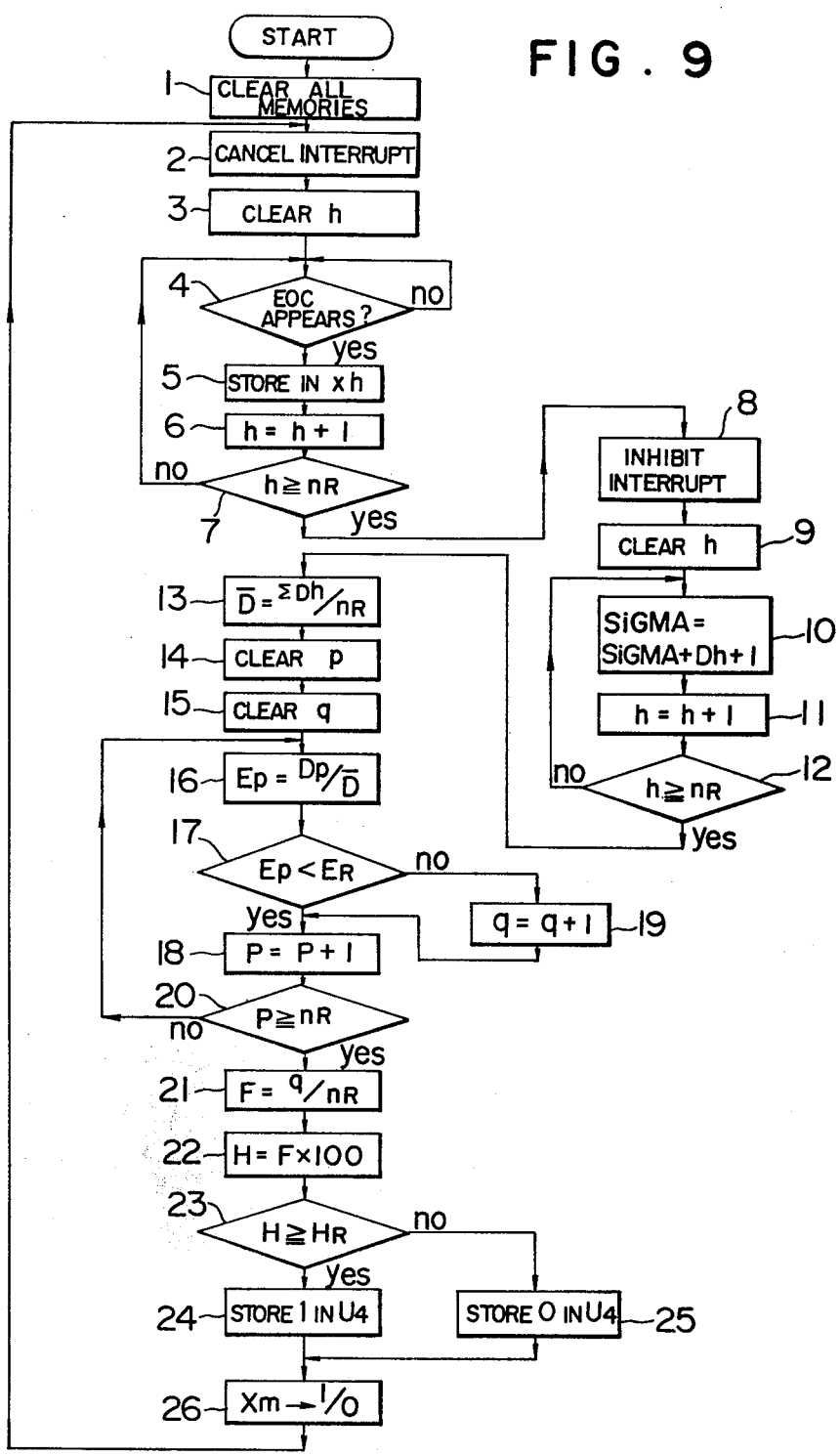
FIG. 9 is a flowchart of the operation of a microcomputer in the circuit of FIG. 8.

In step 27 of the flowchart of FIG. 9, the BUS lines deliver 00000000001 or 000000000000. Among these outputs, "1" and "0" on the BUS11 are stored in the D type flip-flop 120 and then an output is delivered therefrom.

Letter H represents the rate, i.e., the rate of occurence in which how many of the $N_R$ pieces of data including $D_o, D_1, \ldots D_{nR-1}$ are above the $E_R$ times the mean value $\overline{D}$ ($E_R \cdot \overline{D}$). When this rate of occurrence H is higher than a set occurrence rate $H_R$, it indicates that the engine is under a knocking condition and the output terminal 121 assumes "1" level. Whereas when the H is lower, the output terminal 121 assumes "0" level indicating that no knocking exists. Accordingly, the discrimination of the presence or absence of the knocking can be achieved depending on a signal of the output terminal 121.

Figure 10:
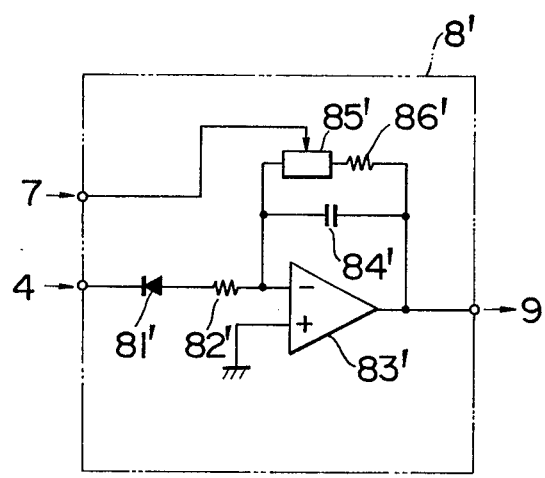
FIG. 10 is a circuit diagram of an integration circuit which may be used in the apparatus of FIG. 1 in place of the peak hold circuit.

Furthermore, although in the above-described first embodiment, the peak hold circuit 8 and A-D converter 9 are used for the purpose of picking up a peak value from vibration waveforms in the range from 10° to 30° after the top dead center, the knocking detection is also possible by using an integrating circuit 8' of FIG. 10 in place of the peak hold circuit 8 to obtain an integrated value of the vibration waveforms in the range of 10° to 30° after the top dead center. In FIG. 10, 81' is a diode which passes a negative wave-form among the vibration waveforms. And a resistor 82', amplifier 83+, capacitor 84', analog switch 83' and resistor 86' constitute an integrator. The analog switch 85' is closed by the pulse in (I) of FIG. 4 from the timing pulse generating circuit 7 applied to the control input, and renders the capacitor 84' to discharge the electric charge thereby to start the integration. In this case, since the input of the integrator is a negative voltage, an output is produced as a positive voltage. Since this integration is started approximately at 10° after the T.D.C., and since, after the integration, the A-D conversion is performed by the A-D converter 9 at a speed of about 10 μsec at 30° after the T.D.C., the converted value corresponds to an integrated value of the vibration wave-forms in the range of 10° to 30° after the T.C.D. Since this integrated value becomes large depending upon the occurrence of the knocking, if this value is processed in the same manner as described above by the rate of occurrence operation circuit 10, it will be appreciated that the output of the rate of occurrence operation circuit 10 corresponds well with the results of the knocking test by hearing.

Furthermore, although in the embodiment described above, the vibration waveforms in the range from 10° to 30° after the T.D.C. are extracted, the discrimination of the knocking is possible by extracting vibration waveforms, either in a range of a constant time period after the ignition or in a constant angle range after the ignition.

As described above, by checking the waveforms at the output terminal 120 of the rate of occurrence operation circuit 10, it is possible to determine whether or not the knocking is occurring. Furthermore, if an indication lamp and a driving circuit are additionally connected to the output terminal 121 to light the lamp when the output terminal is "1" level and to put out the lamp when "0" level, it is apparent that the determination of the occurrence of the knocking will be made by the indication of the lamp.

In the above construction, by setting the various values to be; $N_R=100$, $E_R=2$, and $H_R=6\%$, it was found by experiment that the results of the discrimination of knocking based on a signal at the output terminal 121 correspond very closely with the results of the discrimination based on the sensual tests of hearing.

Furthermore, by adjusting the ignition timing (to retard ignition timing when knocking) by the aid of the knocking signal obtained at the output terminal 121 from the rate of occurrence operation circuit 10, the occurrence of the knocking can be controlled to a minimum. It will be apparent to those skilled in the art that in order to control the ignition timing there are various ways such as; upon occurrence of the knocking, to shift forcibly the point of a distributor to the retard side by an electromagnetic solenoid, by means of an electromagnetic switching valve, to stop advancing effected by the vacuum type advancer, or to retard the ignition timing by a delay circuit. Furthermore, where an electronic ignition timing control device is equipped, which has been widely employed recently, it will also be apparent that an electronic circuit is only needed to be arranged to retard the ignition timing upon occurrence of the knocking. Further, if it is not necessary to control the ignition timing when the knocking occurs, the above-described apparatus may be used as test equipment for indicating whether the knocking is occurring or not.

In the first embodiment, as described above, knocking vibrations in each cylinder can be detected by a single vibration detector 1 owing to the fact that a mechanical vibration acceleration of the cylinder block is detected by the vibration detector 1.

Furthermore, as a detector for detecting the knocking vibrations of the internal combustion engine, besides the vibration detector 1 capable of detecting the mechanical vibration acceleration of the cylinder block, such a detector may be used in which internal pressure vibrations in the internal combustion engine are detected by a finger-pressure detector, and through a high pass-filter, a frequency output above several KHz, corresponding to the knocking vibrations is picked up among the analog signals from the finger-pressure detector, and the analog output of this high-pass filter is used as a knocking vibration. Alternatively, vibration sounds in the internal combustion engine may be picked up by a microphone. Then an output of a desired frequency band which corresponds to knocking vibrations is obtained through a filter, and the analog output from filter may be used as a signal indicative of the knocking vibrations.

Figure 11:
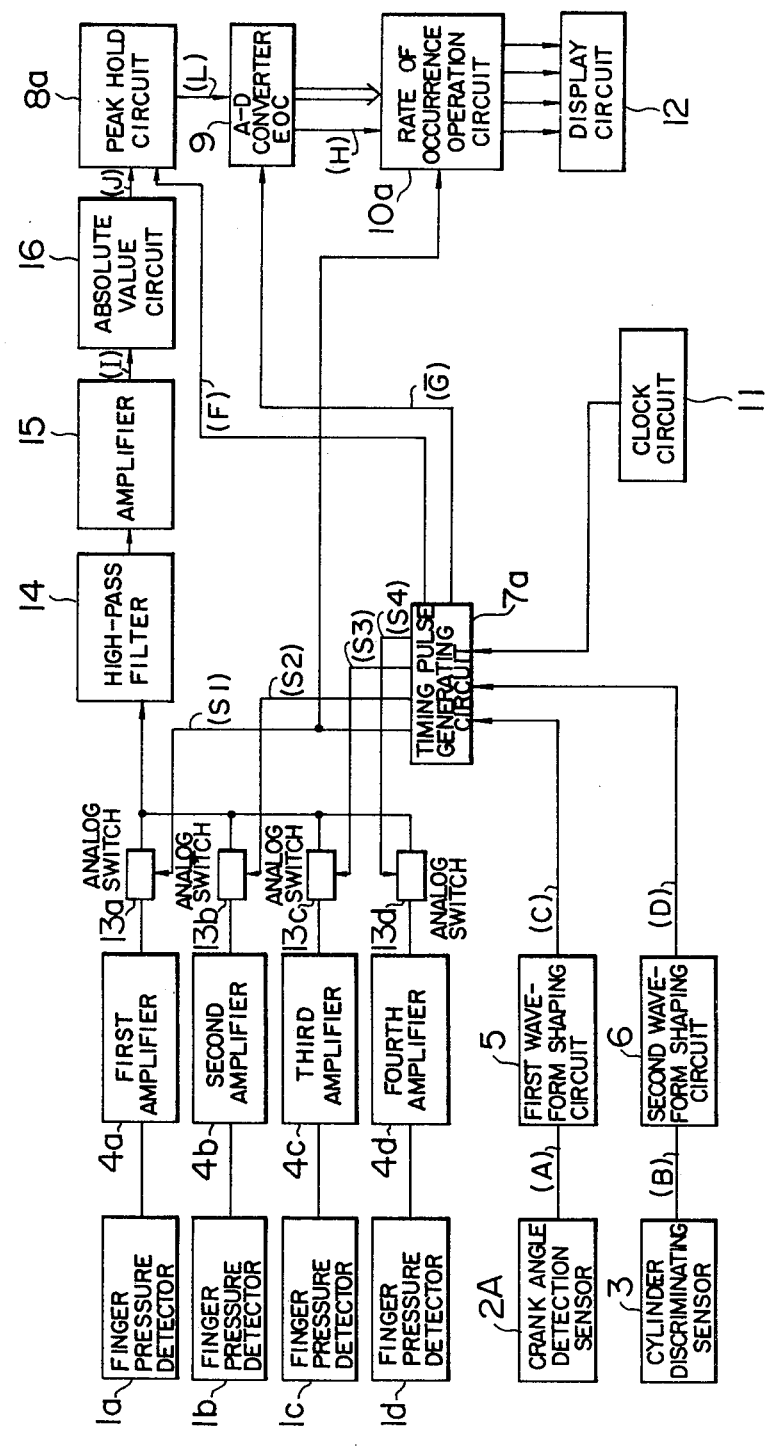
FIG. 11 is a block diagram showing a knocking detection apparatus of a second embodiment according to this invention.

FIG. 11 shows a second embodiment of this invention in which internal pressure vibrations in the internal combustion engine is picked up for detecting the knocking, and in which the knocking detection is applied to a four in-line cylinder internal combustion engine. In FIGS. 11, 1a to 1d are finger pressure detectors each comprising a piezoelectric element and formed in the shape of a washer of an ignition plug. The detector 1a is fixed to the engine together with the ignition plug for the first cylinder, the detector 1b together with the ignition plug for the second cylinder, the detector 1c together with the ignition plug for the third cylinder, and the detector 1d together with the ignition plug for the fourth cylinder.

Figure 12:
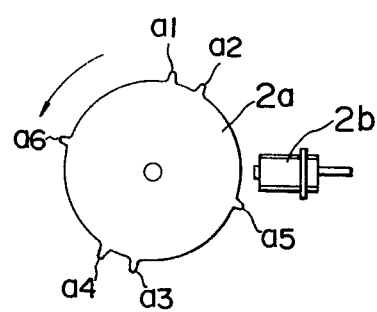
FIG. 12 is a schematic diagram of a crank angle detection sensor used in the apparatus of FIG. 11.

Numeral 2a is a crank angle detecting sensor and is shown the construction thereof in FIG. 12. In FIG. 12, in contrast to the one used in the first embodiment shown in FIG. 2, additional projections are added respectively at a position a5 of 110° after the top dead center of the first and fourth cylinders, and at a position a6 of 110° after the top dead center of the second and the third cylinders.

Figure 13A:
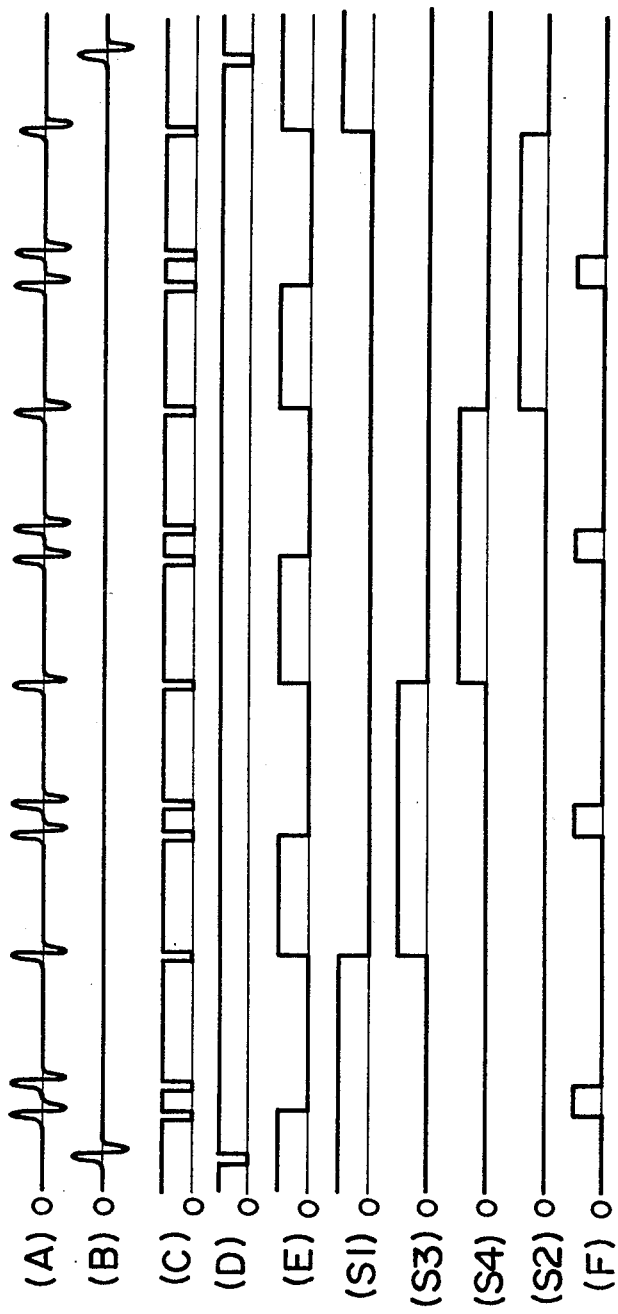
FIG. 13, including 13A and 13B, is a diagram of waveforms for explaining the operation of the apparatus of FIG. 11.

Numeral 3 is a cylinder discriminating sensor and is the same as the one used in the first embodiment and shown in FIG. 3 4a–4d are amplifiers of the same circuitry and each thereof consists of a buffer and an amplifier, and a detailed explanation is omitted since they are well known. 5 is a first waveform shaping circuit and its internal circuit uses the same one as the first embodiment shown in FIG. 5, and it shapes the waveform of an output signal 30 of the crank angle detecting sensor 2A. In FIG. 13, letter (A) is an output signal of the crank angle detecting sensor 2a, (B) is an output signal of the cylinder discriminating sensor 3, and (C) is an output signal of the first waveform shaping circuit 5.

A second waveform shaping circuit 6 is of the same circuit construction as the first waveform shaping circuit 5 and when a waveform in (B) of FIG. 13 is generated from the cylinder discriminating sensor 3, a shaping pulse in (D) of FIG. 13 is generated at the output of the second waveform shaping circuit 6.

Figure 14:
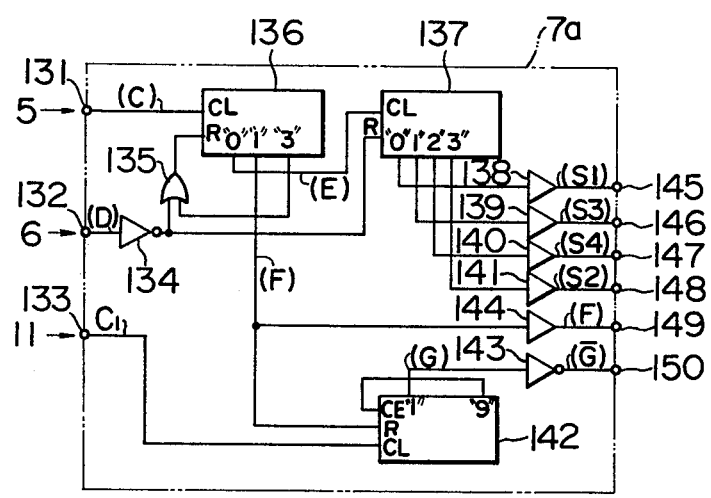
FIG. 14 is a circuit diagram of a timing pulse generating circuit used in the apparatus of FIG. 11.

Numeral 7a is a timing pulse generating circuit and it produces based on the signal from the cylinder discriminating sensor 3 and the crank angle detection sensor 2a, signals applied to the control inputs of analog switches 13a–13d, a signal applied to the control, input of a peak hold circuit 8a, and a trigger signal applied to an A-D converter 89 for starting the A-D conversion. The internal circuit is shown in FIG. 14. In FIG. 14, an input terminal 131 is connected to receive the output of the first waveform shaping circuit 5 and an input terminal 132 is connected to receive the output of the second waveform shaping circuit 6, and an input terminal 133 is connected to receive the clock Cl (200 KHz) from the clock generating circuit 11. The input terminal 132 is connected with one terminal of an OR gate 135 through an inverter 134. The other terminal of OR gate 135 is connected with the output terminal "3" of a counter 136 having a divider. The output of the OR gate 135 is connected with a reset terminal R of the counter 136 having a divider. A clock input CL of this counter 136 is connected with the input terminal 131. Furthermore, the "0" output terminal is connected with a counter 137 having a divider and "1" output terminal is connected with the reset terminal R of a counter 142 having a divider. Any of the counters 136, 137, and 142 having dividers use an IC, RCA, CD 4017. The "0" output terminal of this counter 137 is connected with the input of a buffer 138, and the "1" output terminal with the input of a buffer 139, "2" output terminal with the input of a buffer 140, and "3" terminal is connected with the input of a buffer 141 respectively. Any of the buffers 138, 139, 140 and 141 use an IC, RCA CD4050. Clock enable terminals CE of the counters 136 and 137 are connected to ground. The clock input CL of a counter 142 having a divider is connected with the input terminal 133, the clock enable terminal CE is connected with the output terminal "9" of the counter 142. Also, the "1" output terminal of this counter 142 is connected with the input of an inverter 143. The buffers 138, 139, 140, and 141 are connected with the output terminals 145, 146, 147 and 148 of the timing pulse generating circuit 7a in this order respectively. The "1" output of the counter 136 is connected with the output terminal 149 through a buffer 144, and the inverter 143 is connected with the output terminal 150 respectively.

The operation of the timing pulse generating circuit 7a will be explained as follows. The pulse in (D) of FIG. 13 is fed to the input terminal 132. Accordingly, an inverted pulse of the (D) pulse is applied to the counter 136 having a divider, and when the (D) pulse is "0" level, the counter 136 is reset. Then, the pulse in (C) of FIG. 13 is fed to the clock input of this counter 136. And, at the time of the rise of the third pulse, "1" enters the OR gate 135, and the counter 136 is reset. Thus, on the "0" output terminal, a waveform as shown in (E) of FIG. 13 appears. Next, when the (D) waveform is "0", the counter 137 having a divider is reset, and the waveform (E) enters the input clock. Thus, on the "0" output terminal a waveform the same as ($S_1$) of FIG. 13 is produced, and on the "1" output terminal a waveform the same as ($S_3$) of FIG. 13, on the "2" output terminal a waveform the same as ($S_4$), and on the "3" output terminal a waveform the same as ($S_2$) of FIG. 13 is produced. Accordingly, the outputs of the buffers 138, 139, 140, and 141 assume the waveforms as shown in ($S_1$), ($S_3$), ($S_4$) and ($S_2$) of FIG. 13 respectively.

On the "1" output terminal of the counter 136 having a divider, a waveform shown in (F) of FIG. 13 is produced. Accordingly, the counter 142 having a divider is reset when a pulse of the waveform (F) is "1" level, and it counts the clock $C_1$ of 200 KHz, when the pulse becomes "0" from "1". However, since "1" enters the clock enable terminal after counting the ninth pulse, it is held as long as it is held as long as it is not reset. Thus, on the "1" output terminal, a narrow pulse of 10 μsec is generated as shown in (G) of FIG. 13, when the waveform (F) of FIG. 13 becomes "0" form "1". Inverting this pulse by the inverter 143, a waveform (G) of FIG. 13 is produced on the output terminal 150 of the timing pulse generating circuit 7a. Also, the output of the buffer 144 assumes the waveform as shown in (F) of FIG. 13.

Numerals 13a–13d are the analog switches (FIG. 11) and they become conductive when the control input is "1" and they are cut off when the control input is "0". As the control inputs, the output signals ($S_1$), ($S_2$), ($S_3$) and ($S_4$) from the timing pulse generating circuit 7a are applied in this order to the analog switches 13a–13d are connected in common. When the signal ($S_1$) of FIG. 13 is "1", the analog switch 13a becomes conductive and is cut off when "0", when the signal ($S_3$) is "1", the analog switch 13c becomes conductive and is cut off when "0", when the signal ($S_4$) is "1", the analog switch 13d becomes conductive and is cut off when "0", and when the signal ($S_2$) is "1", the analog switch 13b becomes conductive and is cut off when "0". As a result, the outputs of the analog switches 13a–13d respectively represent a finger-pressure waveform of the first cylinder generated between 110° after the T.D.C. of the second cylinder and 110° after the T.D.C. of the first cylinder, a finger-pressure waveform of the third cylinder between 110° after the T.D.C. of the first cylinder and 110° after the T.D.C. of the third cylinder, a finger-pressure waveform of the fourth cylinder between 110° after the T.D.C. of the fourth cylinder, and a finger-pressure waveform of the second cylinder between 110° after the T.D.C. of the fourth cylinder and 110° after the T.D.C. of the second cylinder. In this case, the reason that the position at 110° after the T.D.C. of each cylinder is selected as a switching position of each of the analog switches 13a–13d is as follows: By switching at this switching position, high frequency noise will be generated and will eventually be passed to the output of the following high-pass filter 14. However, since the waveform actually required is of the range 10°-30° after the T.D.C. of each cylinder, the high frequency noise generated at 110° after the T.D.C. will not affect the required waveform. Although any position may be selected as a switching position as far as the switching position is out of the above range, the position of 110° after the T.D.C. of each cylinder from the range as far as possible.

The high-pass filter 14 is a high-pass active filter above 5 KHz and employs an NF circuit Block Design Co., No. DV4BH. Capacitors (not shown) are respectively connected to the input and output of the filter 14.

Numeral 15 is an alternating current amplifier and the amplification factor is set at about 100 times, and detailed explanation is omitted because it is well known.

The output waveform of this alternating current amplifier 15 is shown in (I) of FIG. 13. Referring to the waveform (I) of FIG. 13, a waveform of $t_1$ is generated by the combustion process in the first cylinder, $t_2$ is noise generated when the analog switches 13a and 13b are switched, $t_4$ is ignition noise generated in the third cylinder, $t_5$ is a waveform generated by the combustion process in the third cylinder, $t_6$ is noise generated by switching the analog switches 13c and 13d, $5_7$ is ignition noise of the fourth cylinder, $t_8$ is a waveform generated by the combustion process in the fourth cylinder, $t_9$ is noise generated by switching the analog switches 13d and 13b, $t_{10}$ is ignition noise of the second cylinder, $t_{11}$ is a waveform generated by the combustion process in the second cylinder, $t_{12}$ is noise generated by switching the analog switches 13b and 13a. Such waveforms as generated by opening the intake valve and the exhaust valve of each cylinder are included in the noise of $t_2$, $t_6$, $t_9$ and $t_{12}$.

Numeral 16 is an absolute valve circuit and it employs the circuit described on page 163 of the "Operational Amplifier Hand Book of 1976", published by Electronics Digest Co., with the exception that the circuit constant is different. Thus, explanation is omitted. In the operation, it converts a negative waveform into a positive waveform, and produces a waveform shown in (J) of FIG. 13.

Figure 15:
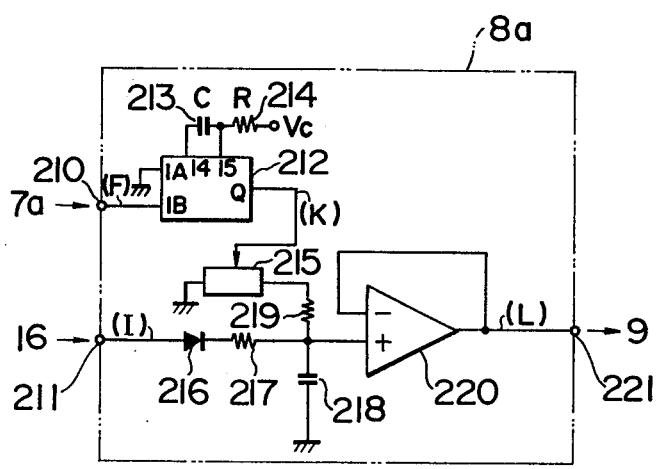
FIG. 15 is a circuit diagram of a peak hold circuit used in the apparatus of FIG. 11.

Numeral 8a is a peak hold circuit and its internal circuit is shown in FIG. 15. Referring to FIG. 15, an input terminal 210 is connected to receive the signal (F) from the timing pulse generating circuit 7a and this input terminal 210 is further connected with an input 1B of a monostable multivibrator IC designated by numeral 212 and employing a Texas Instrument Co. No. SN74123. The input 1A is connected to ground. By connecting a capacitor 213 between terminals 14 and 15 of this IC212, and also by connecting a resistor 214 between the terminal 15 and a power supply $V_c (=5 V)$, an output pulse is generated at the output Q as shown in (K) of FIG. 13. This output pulse is generated simultaneously with the rise of the signal (F) from the timing pulse generating circuit 7a and has a pulse width of about 100 $\mu$sec determined by the capacitor 213 and the resistor 214. The output Q is connected with the control terminal of an analog switch 215. The input terminal 211 is connected to receive an output signal from the absolute value circuit 16 and this input terminal 211 is further connected with the anode of a diode 216. The cathode of the diode 216 is connected with the non-inverting input of a buffer amplifier 220 through a resistor 217. Also, the input of the analog switch 215 is connected with the non-inverting input of the buffer amplifier 220 through a resistor 219, and the output is connected to ground. A capacitor 218 is connected between the non-inverting input of the buffer amplifier 220 and ground. The inverting input of the buffer amplifier 220 is connected with the output of this buffer amplifier. This output of the buffer amplifier is connected with the output terminal 221 of the peak hold circuit 8a.

The operation of the peak hold circuit 8a will be explained hereinafter. The pulse shown in (K) of FIG. 13 is produced on the output of the multivibrator 212 when the signal shown in (F) of FIG. 13 is fed to the input terminal from the timing pulse generating circuit 7a. The analog switch 215 is closed due to the pulse width of this pulse (K) to discharge the electric charge of the capacitor 218 through the resistor 219 thereby to set the voltage of the capacitor 218 to 0 V (zero volt). Thereafter, the output (I) of the absolute value circuit 16 is charged on the capacitor 218 through the diode 216. Accordingly, the voltage of the capacitor 218 becomes a peak value of the voltage which is developed between a reset operation and the next reset. The voltage of this capacitor 218 appears on the output of the following buffer amplifier 220 of a high input impedance. This output assumes a waveform shown in (L) of FIG. 13. This circuit 8a may employ the peak value rectifier circuit disclosed on page 135 of "Recent Ope-Amp Operating Techniques" published by Seibundo-Shinkasha in February 1975.

Numeral 9 is an A-D converter (FIG. 11) and employs an 8 bit A-D converter IC, No. MN5120 of Micro Network Co. As soon as the ($\overline{G}$) output signal from the timing pulse generating circuit 7a enters the start-convert terminal of the A-D converter 9, it starts conversion, and after finishing the conversion a pulse shown in (H) of FIG. 13 is generated on the EOC terminal. This conversion time is approximately 10 $\mu$sec. In this case, the signal ($\overline{G}$) of FIG. 13 represents a waveform generated at 30° after the T.D.C. of each cylinder, and since the A-D converter converts the voltage of the peak hold circuit 8a during the period from this waveform until the lapse of 10 $\mu$sec, the 8 bit binary code value produced by the A-D converter 9 represents substantially a peak value of the signal waveform during 10°–30° after the T.D.C. of each cylinder. The EOC output of the A-D converter 9 is connected with the interrupt terminal of the rate of occurrence operation circuit 10a whereas the 8 bit binary code output is connected with the I/O terminal respectively.

Figure 16:
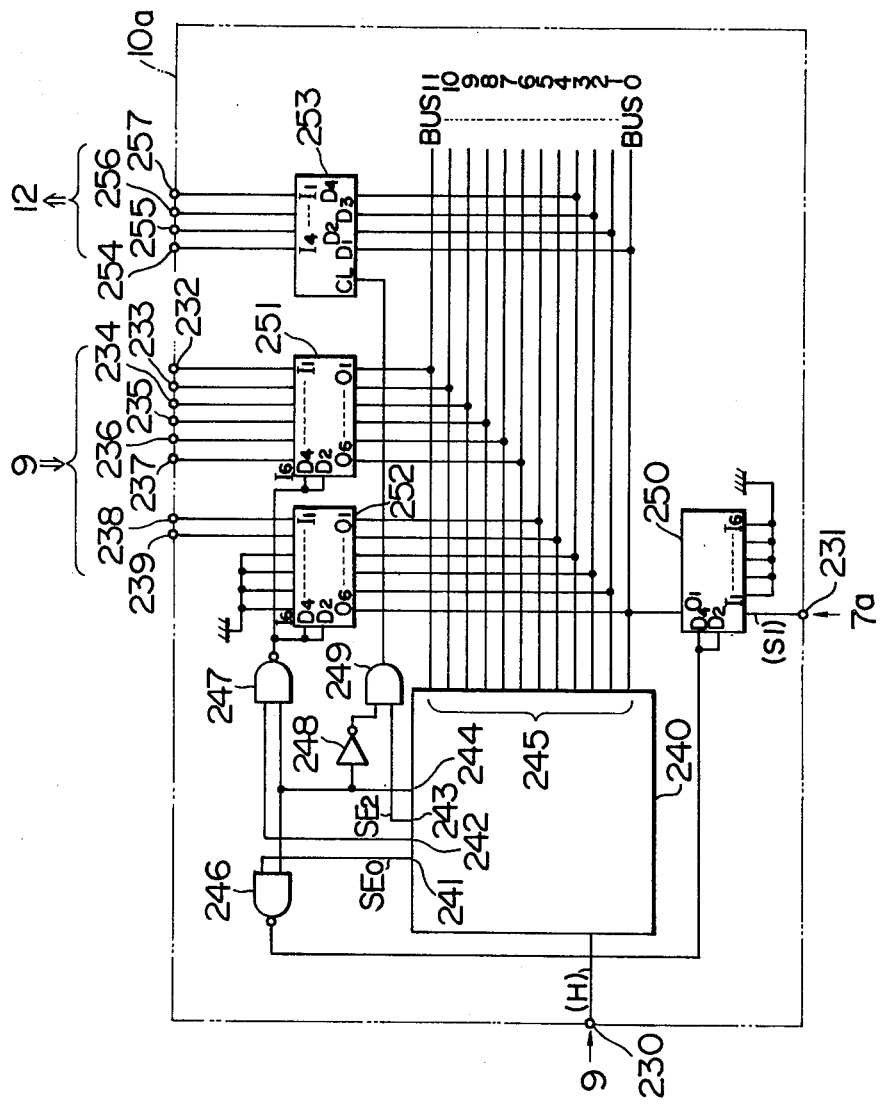
FIG. 16 is a circuit diagram of a rate of occurrence operation circuit used in the apparatus of FIG. 11.

The rate of occurrence operation circuit 10a will be explained. The internal circuit of the rate of occurrence operation circuit 10a is shown in FIG. 16. The input terminal 230 is connected to the output EOC terminal of the A-D converter 9. Also, the input terminal 231 is connected with the output ($S_1$) of the timing pulse generating circuit 7a. The input terminals 232, 233, 234, 235, 236, 237, 238 and 239 are connected with the 8 bit binary code outputs of the A-D converter 9 in digit number order starting from the smallest respectively. 240 is a microcomputer which employs a Toshiba TLCS-12. The circuitry and operation of this microcomputer are well known and need not be explained. However, it uses a clock frequency (2 MHz) internally provided, and when power is applied thereto it initializes and commences operation starting from an address of ROM as designated. One of the eight interrupt signal lines of this microcomputer 240 is connected with the input terminal 230. Also, the terminals 241, 242, and 243 are connected with three lines $SE_0$, $SE_1$ and $SE_2$ (not shown) respectively among sixteen device adress select signal lines of an internal input/output control unit (hereinafter referred to as DCU) of the microcomputer 240 thereby to connect the device with BUS lines. This terminal 241 is connected with one terminal of a NAND gate 246, the terminal 242 with one terminal of a NAND gate 247 and the terminal 243 with one terminal of an AND gate 249 respectively.

The terminal 244 is connected to an input/output command line of the DCU, and when the level at this terminal is "1", data is transferred from the device to the processor (hereinafter referred to as CPU) within the microcomputer 240, and at "0" level, data is transferred from the CPU to the device. The terminal 244 is connected with the other terminals of the NAND gate 246 and the NAND gate 247, and this terminal is also connected to the other terminal of the AND gate 249 through an inverter 248.

Numeral 245 is BUS lines of 12 bits and has twelve lines. BUS 11 is the least significant digit and BUS 0 is the most significant digit. 250 is a buffer circuit consisting of six circuits of 3 state non-inverting buffer type and employs a Toshiba No. TC-5012P circuits. The input $I_1$ is connected with the input terminal 231 of the rate of occurrence operation circuit 10a, and DISABLE terminals $D_4$ and $D_2$ are both connected with the output of the NAND gate 246. The output $O_1$ is connected with the BUS 0 line. 251 is the same as the buffer circuit 250, and the inputs $I_1$, $I_2$, $I_3$, $I_4$, $I_5$ and $I_6$ are connected with the input terminals, 232, 233, 234, 235, 236, 237 of the rate of occurrence operation circuit 10a in this order respectively. DISABLE terminals $D_4$ and $D_2$ are connect with the output of the NAND gate 247. And the outputs $O_1$, $O_2$, $O_3$, $O_4$, $O_5$ and $O_6$ are connected with the BUS lines; BUS 11, BUS 10, BUS 9, BUS 8, BUS 7 and BUS 6 in this order respectively.

Numeral 252 is a buffer circuit using the same TC5012P as the buffer 250.

Inputs $I_1$ and $I_2$ are connected with the input terminals 238, and 239 in this order respectively. The reset inputs $I_3$, $I_4$, $I_5$ and $I_6$ are connected commonly to ground. DISABLE terminals $D_4$ and $D_2$ are connected commonly with the output of the NAND gate 247. Also the outputs $O_1$, $O_2$, $O_3$, $O_4$, $O_5$ and $O_6$ are connected with the BUS lines; BUS 5, BUS 4, BUS 3, BUS 2, BUS 1 and BUS 0 in this order respectively. 253 is a memory and uses the IC, RCA No. CD4035. The clock input CL is connected with the output of the AND gate 249 and the inputs $D_1$, $D_2$, $D_3$ and $D_4$ are connected with BUS lines; BUS 0, BUS 1, BUS 2, and BUS 3 respectively, and the reset terminal is connected to ground. The outputs of this memory 253 are connected to the output terminals 254, 255, 256 and 257 of the rate of occurrence operation circuit 10a.

The operation of the rate of occurrence operation circuit 10a will be explained referring to the flowchart of FIG. 17. When a key switch (not shown) is turned on, power is applied thereto and the operation starts. In step 1, all memories are cleared except the ROM of the microcomputer 240. In step 2, $U_0$ among the memory area U of RAM is cleared. In step 3, $U_1$ is cleared and makes h zero. In step 4, $U_2$ is cleared and makes i zero. In step 5, $U_3$ is cleared and makes j zero. In step 6, a master mask is set and executes a swap instruction to enable an interrupt signal to enter. And, as soon as the engine starts and rotates, the A-D converter commences conversion in response to the pulse (G) of FIG. 13 fed from the timing pulse generating circuit 7a, and after this conversion is completed, it generates the EOC pulse shown in (H) of FIG. 13. This pulse (H) is applied to the input terminal 230 of the rate of occurrence operation circuit 10a thereby to interrupt the microcomputer 240 and to start operation. This process is performed in step 7. If the EOC pulse does not appear, it waits until it appears, and when the EOC pulse appears the process proceeds to step 8. In step 8, a device address select signal $SE_0$ is delivered to the terminal 241, after the input/output command signal becomes "1" by the device control unit (DCU) in the microcomputer 240. When both the input/output command signal and the device address select signal are "1", the NAND gate 246 becomes "0" and couples the input/output of the buffer 250 thereby to load the data delivered to the BUS lines on a register of the processor in the microcomputer 240. Step 9 discriminates whether only the most significant digit of the 12 bit data stored in the register of this processor is "1" or "0", and if it is "Yes" the process proceeds to step 10 and if it is "no", proceeds to step 11. Step 10 sets $U_0$ in the memory U area to "1" and then proceeds to step 11. The step 11 discriminates whether the content of the memory $U_0$ is "1" or not, and if it is "Yes", it proceeds to step 12, and if it is "No", then returns to step 7. If the memory $U_0$ has been set to "1", the process can proceed to step 12 without any condition until the memory $U_0$ is reset. The steps 8, 9, 10, and 11 are the processes required to store the data in the memory sequentially from the data of the first cylinder. The step 12 is the process including the steps of 8 and 9, and it discriminates in the same procedure as the steps 8 and 9 whether or not the just entered data is for the first cylinder, and if it is "Yes", the process proceeds to step 13, whereas if it is "no", the process proceeds to step 14.

The step 13 adds 1 to the content h of the memory $U_1$ and this is stored again in the memory $U_1$. And this step also clears the memory of $U_2$ to cause the content i to become 0. Thus, initially, by the process of effecting 0+1, 1 is stored. Similarly, the step 14 adds 1 to the content i of the memory $U_2$ and stores the result in the memory $U_2$. Thus, since, initially the content i is zero (i=0), 1 is stored by the process of 0+1. Step 15 multiplies the content i of the memory $U_2$ by a set number of times $N_R$ (=100) which has been programmed in ROM in advance and stores the product in the memory $U_3$.

Step 16 adds the content h of the memory $U_1$ to the content j of the memory $U_3$ and stores the result in the memory $U_4$. Step 17 stores the data entering through the inputs 232-239 of the rate of occurrence operation circuit 10a in the address of $X_r$ in an X area of the memory designated by the content of the memory $U_4$. Step 18 discriminates whether the content k of the memory $U_4$ has exceeded $4 \times N_R$ or not, and if it is "No", the process returns to step 7, whereas if it is "Yes", proceeds to step 19. In the processes of steps 7 and 8, if the set number of times $N_R$ is supposed to be 100, among the A-D converted data, the data for first cylinder is stored in memories from $X_1$ to $X_{100}$, the data for third cylinder is stored in memories from $X_{101}$ to $X_{200}$ the data for fourth cylinder is stored in memories from $X_{201}$ to $X_{300}$, and the data for second cylinder is stored in memories $X_{301}$ to $X_{400}$ in this order respectively.

Step 19 inhibits the interruption by resetting the master mask and by executing the swap order. Step 20 causes the content m to become zero by clearing the memory $U_5$. Step 21 multiplies the content m of the memory $U_5$ by the set number of times $N_R$ programmed in the ROM, and stores the result in the memory $U_6$. Step 22 sets the content n of the memory $U_7$ to 1. Step 23 sets the content S to zero by clearing $Y_0$ in memory Y area. Step 24 stores in memory $U_8$ the result obtained by adding the content n of the memory $U_7$ to the content e of the memory $U_6$. Accordingly, since, initially m=0 and n=1, P becomes 1 (P=1). Step 25 stores in the memory $Y_0$ the result obtained by adding the content $D_P$ of $X_P$ in the memory X designated by the content P of the memory $U_5$ to the content S of the memory $Y_0$ in the memory Y area. And step 26 stores in the memory $U_7$ the result obtained by adding 1 to the content n of the memory $U_7$. Step 27 discriminates whether or not the content n of the memory $U_7$ is larger than the set number of times $N_R$, and if it is "Yes" the process proceeds to step 28 whereas if it is "No", returns to step 24. Accordingly, by the processes from step 22 to step 27, assuming that m=0 and $N_R=0$, it results in that the data for the first cylinder $D_1+D_2+D_3+ \ldots +D_{100}$ are contained in the contents S of the memory $Y_0$.

Step 28 stores in the memory $Y_1$, the divided value $\overline{D}_m$ obtained by dividing the content S of the memory $Y_o$ by the set number of times $N_R$. The $\overline{D}_m$ represents a mean value. Step 29 sets the content of the memory $U_9$ to 1. Step 30 sets the content r to zero by clearing the memory $U_{10}$. Step 31 stores in memory $Y_2$ the divided value $E_q$ obtained by dividing the data $D_q$ of memory $X_q$ designated by the content q of the memory $U_9$ by the content $\overline{D}_m$ of the memory $Y_1$.

Step 32 discriminates whether or not the content $E_q$ of the memory $Y_2$ is smaller than a set value $E_R$ which has been programmed beforehand in ROM, and if it is "Yes", the process proceeds to step 34 whereas if it is "No", proceeds to step 33. The step 33 stores in the memory $U_{10}$ the result obtained by adding 1 to the content r of the memory $U_{10}$. Thus, initially r assumes zero (r=0). The step 34 stores in the memory $U_9$, the result obtained by adding 1 to the content q of the memory $U_9$. Thus, initially, q assumes 1, next it will become 2, and then 3. Step 35 discriminates whether or not the content q of the memory $U_9$ is larger than the set number of times $N_R$, and if it is "Yes", the process proceed to step 36, whereas if it is "No", returns to step 31. Accordingly, in the processes from step 29 to step 35, each of the data $D_1, D_2, \ldots D_{NR}$ stored in the memories $X_1, X_2, \ldots X_{NR}$ are divided by the mean value $D_m$ to obtain the divided values $E_1, E_2 \ldots E_{NR}$. And among the divided values $E_1, E_2 \ldots E_{NR}$, the number of those data which are above the set value $E_R$ becomes the content r of the memory $U_{10}$.

Step 36 enters the content r of the memory $U_{10}$ into the register $R_2$ among eight general registers in the processor, and reads out the set number of times $N_R$ from the ROM and performs the division. This divided value F remains in the registers $R_2$ and $R_3$. Step 37 multiplies the contents of the registers $R_2$ and $R_3$ by 100 read out from the ROM. The multiplied value (or product) H represents the rate of occurrence and remains in the registers $R_2$ and $R_3$. The upper digit is in $R_2$ and the lower digit is in $R_3$.

Step 38 discriminates whether or not the content of the registers $R_2$ and $R_3$ are above the set value $H_R$. If it is "Yes", the process proceeds to step 39, whereas if it is "No", proceeds to step 40. The step 39 reads out the content m of the memory $U_5$ and sets the m-th digit of the memory $U_{11}$ of "1". The step 40 sets the m-th digit of the memory $U_{11}$ to "0". Since the initial m is "0", it means that the most significant digit of the memory $U_{11}$ is set. Step 41 adds 1 to the content of the memory $U_5$ and stores the result in the memory $U_5$. Step 42 discriminates whether or not the content m of the memory $U_5$ is above 4, and if it is "No", the process returns to step 21, whereas if it is "Yes", proceeds to step 43. As described above, in the processes from step 20 to step 28, the data for the first cylinder $D_1, D_2 \ldots D_{100}$ are obtained, where the set number of times $N_R$ is selected to be 100, and then the mean value $\overline{D}_0$ is obtained. Each piece of the data ($D_1, D_2 \ldots$ or $D_{100}$) is divided by the mean value $\overline{D}_0$ to obtain the ratio ($D_1/\overline{D}_0, D_2/\overline{D}_0 \ldots$ or $D_{100}/\overline{D}_0$). If the number of pieces of data, whose ratio is above the set value $E_R$, becomes above the set value $H_R\%$ the 0-th (zero-th) digit of the memory $U_{11}$ is set to 1, whereas when below the $H_R\%$, it is set to 0. Then, in the same manner, the data for the third cylinder $D_{101}, D_{102} \ldots D_{200}$ are picked up and the mean value $\overline{D}_1$ is obtained. The respective pieces of the data are divided by the mean value $\overline{D}_1$ to obtain the ratios. When the number of pieces of data, whose ratio is above the set value $E_R$, becomes above the $H_R\%$, the 1-st digit of the memory $U_{11}$ is set to 1, whereas when below the $H_R\%$, it is set to 0. Similarly, the data for the fourth cylinder $D_{201}, D_{202} \ldots D_{300}$ are picked up and the mean value $\overline{D}_2$ thereof is obtained. Then, by dividing the respective pieces of data by the mean value $\overline{D}_2$, the ratios are obtained. When the number of pieces of data, whose ratio is above the set value $E_R$, becomes above the $H_R\%$, the 2-nd digit of the memory $U_{11}$ is set to 1, whereas when below the $H_R\%$, it is set to 0. Similarly, the data for the second cylinder $D_{301}, D_{302} \ldots D_{400}$ are picked up and the mean value $\overline{D}_3$ thereof is obtained. The respective pieces of data are divided by the mean value $\overline{D}_3$ to obtain the ratios. When the number of pieces of data, whose ratio is above the $E_R$, becomes above the $H_R\%$ the 3-rd digit of the memory $U_{11}$ is set to 1, whereas when below the $H_R\%$, it is set to 0.

Step 43 outputs the content of the memory $U_{11}$ to the I/O bus line. In this case, the input/output command signal is delivered from the terminal 244 and becomes zero, and at substantially the same time the device address select signal $SE_2$ is delivered from the terminal 243 and becomes 1. Almost simultaneously, the content of the memory $U_{11}$ is delivered to the I/O bus line. By the inverter 248 and AND gate 249, when the input/output command signal and the device address select signal meet the above mentioned condition, a signal which becomes 1 from 0 is generated. By this signal, the required data among those appearing on the I/O bus lines are stored in the upper four digits of the memory 253. Then the microcomputer 240 returns to step 2 of the flowchart of FIG. 17.

Figure 17B:
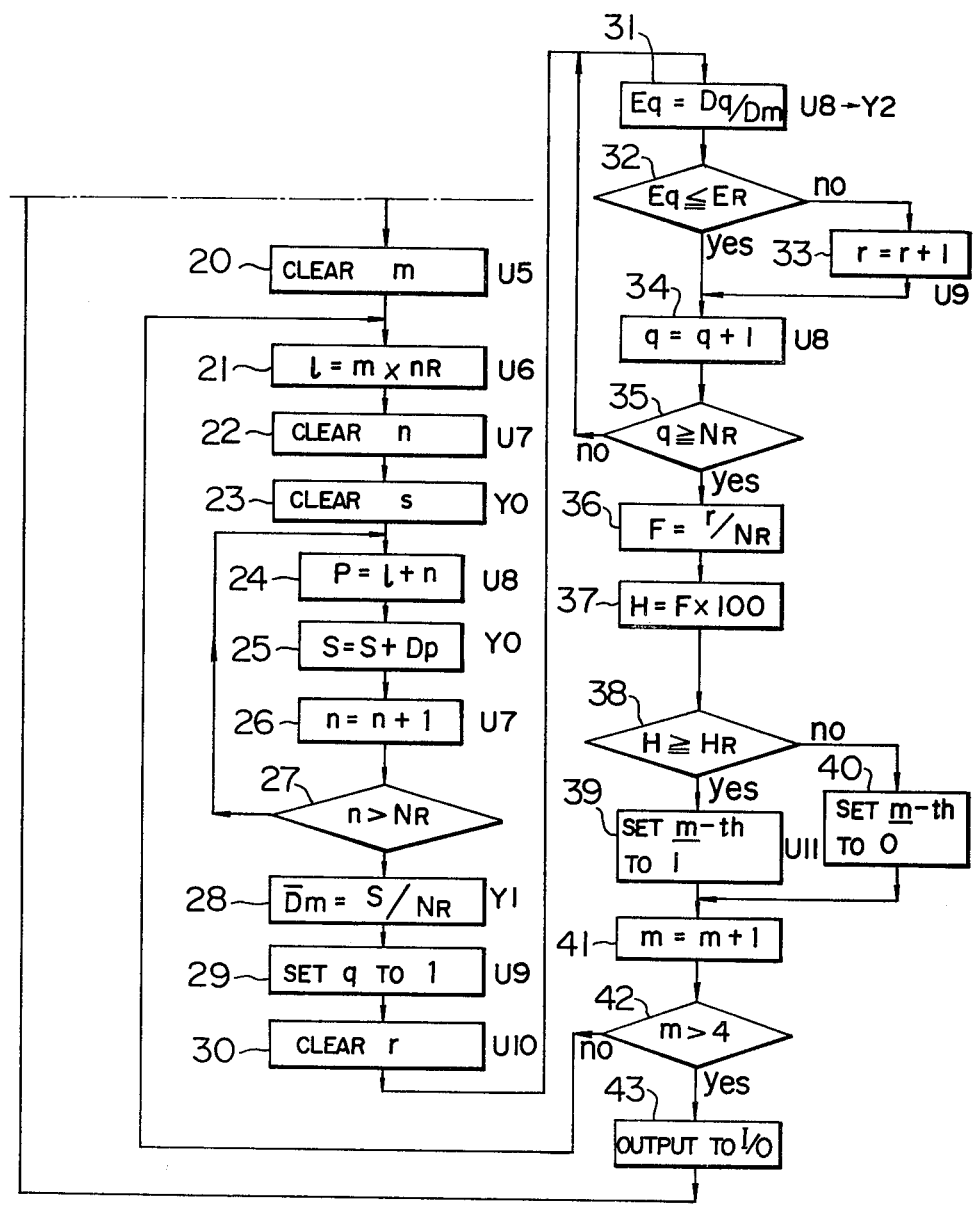
FIG. 17, including 17A and 17B, is a flowchart of the operation of a microcomputer in the circuit of FIG. 16.

Furthermore, in the flowchart of FIG. 17, for example, in the case of discriminating as in the step 7, there are more detailed steps, and also in the case of returning to the previous step, further detailed steps are needed, however explanation will be omitted because they are well known.

Consequently, at the output of the memory 253, that is, at the output terminal 254 of the rate of occurrence operation circuit 10a, the result of the operation and processing for the first cylinder is delivered. Similarly, at the output terminal 255, the operation result for the third cylinder is delivered, and at the output terminal 256, the operation result for the fourth cylinder is delivered, and at the output terminal 257, the operation result for the second cylinder is delivered.

Figure 18:
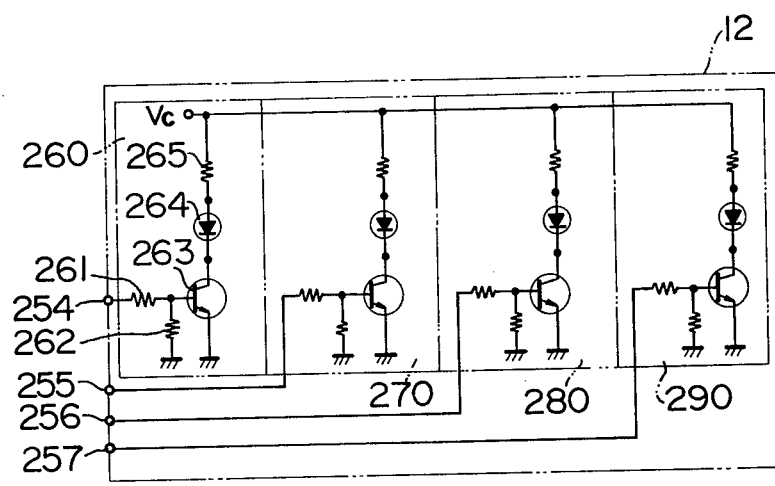
FIG. 18 is a circuit diagram of a display circuit used in the apparatus of FIG. 11.

Numeral 12 (FIG. 11) designates a display circuit, and the circuitry is shown in FIG. 18. In FIG. 18, 260 is a display circuit for the first cylinder, and one end of the resistor 261 is connected with the output terminal 254 of the rate of occurrence operation circuit 10a, and the other end is connected with the base of a transistor 263. The emitter of the transistor 263 is connected to ground. A resistor 262 is inserted between the base and the emitter of this transistor 263, and the collector is connected with the cathode of a light emitting diode 264. The anode of this light emitting diode 264 is connected with the power voltage $V_c$ through a resistor 265.

The operation of the display circuit 12 constructed as described above will be explained. When a voltage is applied to the terminal 254, base current flows to the transistor 263 through the resistor 261, and the transistor 263 conducts. Thus, the light emitting diode 264 is lit. When the voltage is not applied to the terminal 254, the transistor 263 is cut off and the light emitting diode is put out. Likewise, 270 is a display circuit for the third cylinder, 280 is for the fourth cylinder, and 290 is for the second cylinder, and the operation of these display circuits is the same as the display circuit 260.

A clock circuit 11 (FIG. 11) is the same as the one employed in the first embodiment, and consists of an oscillating circuit using a crystal oscillator and a counter for dividing an oscillation frequency.

As described above, by watching the turning on or putting out of the light emitting diode, it will be able to determine for each cylinder whether or not knocking is occurring.

Figure 19:
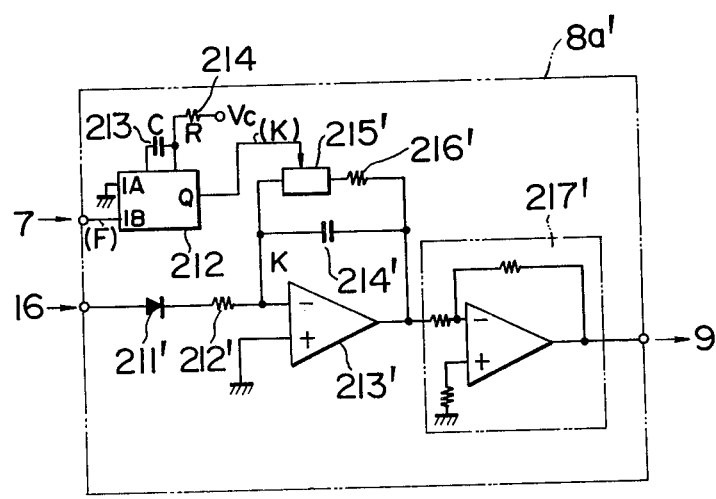
FIG. 19 is a circuit diagram of an integration circuit used in the apparatus of FIG. 11 in place of the peak hold circuit.

It has been proved by experiments that the results of the knocking discrimination according to the present apparatus in which various set values are set to be; $N_R = 100$, $E_R = 2$, and $H_R = 6\%$, well correspond with the results of sensual tests by hearing. Furthermore, although in the second embodiment discribed above, the peak hold circuit 8a and A-D converter 9 are used for the purpose of obtaining a peak value among the waveforms in the range of 10°–30° after the top dead center, knocking discrimination will be achieved by using the integration circuit 8a' of FIG. 19 instead of the peak hold circuit 8a in order to obtain an integrated value of the waveforms in the range of 10°–30° after the top dead center. In FIG. 19, 211' is a diode and passes a positive waveform among the waveforms. And a resistor 212', an amplifier 213', a capacitor 214', an analog switch 215' and a resistor 216' constitute an integrator. Numerals 212, 213 and 214 designate respectively an IC, a capacitor and a resistor constituting a monostable multivibrator which is the same as the one shown in FIG. 15, and it generates an output as shown in (K) of FIG. 13 having a duration of about 100 μsec from the rise of the (F) signal generated by the timing pulse generating circuit 7a. The analog switch 215' is closed by the pulse shown in (K) of FIG. 13 applied to the control input and renders the integration start by discharging the electric charge of the capacitor 214'. In this case, since the input of the integrator is a positive voltage, the output is produced as a negative voltage.

Accordingly, a positive voltage is obtained by inverting by an inverting amplifier 217' having the gain of 1. The start of this integration is at about 10° after the T.D.C., and after the integration and at about 30° after the T.D.C. the result of the integration is converted by the A-D converter at a speed of 10 μsec. Thus, the converted value corresponds to an integrated value of the waveforms in the range of 10°–30° after the T.D.C. Since this integrated value becomes large depending on the occurrence of knocking, by processing the integrated value in the rate of occurrence operation circuit 10a in the same manner as described above and by displaying the processed result in the display circuit 12, the same discrimination result as that described in the foregoing can be achieved.

Furthermore, although in the second embodiment, the sampling interval is set to be 10°–30° after the T.D.C., no large difference was perceived even when the sampling interval was selected to be from 10° before the T.D.C. to 30° after the T.D.C.

Furthermore, when the presence or absence of the knocking is discriminated for each cylinder individually as in the second embodiment, and when the ignition timing is controlled depending on the presence or absence of the knocking, the ignition timing control for individual cylinders can be achieved.

We claim:

1. A method for detecting engine knocking comprising the steps of:
   monitoring vibrations of an internal combustion engine during the rotation of said engine;
   generating a peak signal, during a predetermined interval close to the top dead center position of a piston of said engine, having a magnitude related to a peak magnitude of said monitored vibrations;
   repeating said monitoring step and said peak signal generating step for a predetermined number of rotations of said engine;
   generating an average signal having a magnitude related to said peak signals magnitudes relative to said predetermined number of rotations of said engine;
   generating a plurality of proportion signals each having a magnitude related to one of said peak signals magnitude relative to said average signal magnitude;
   comparing each of said relative signals with a first predetermined reference signal to produce a comparison output indicative of the number of said proportion signals which are in excess of said first predetermined reference signal;
   generating an occurrence signal having a magnitude related to said comparison output relative to said predetermined number of rotations; and
   generating a knock signal indicative of the presence of knocking in said engine when said occurrence signal magnitude exceeds a second predetermined reference signal.

2. A method for detecting engine knocking comprising the steps of:
   monitoring vibrations of an internal combustion engine during the rotation of said engine;
   generating an integration signal, during a predetermined interval close to the top dead center position of a piston of said engine, having a magnitude related to the integral of said monitored vibrations;
   repeating said monitoring step and said integration signal generating step for a predetermined number of rotations of said engine;
   generating an average signal having a magnitude related to said integration signals magnitudes relative to said predetermined number of rotations of said engine;
   generating a plurality of proportion signals each having a magnitude related to one of said integration signals relative to said average signal magnitude;
   comparing each of said relative signals with a first predetermined reference signal to produce a comparison output indicative of the number of said proportion signals which are in excess of said first predetermined reference signal;
   generating an occurrence signal having a magnitude related to said comparison output relative to said predetermined number of rotations; and
   generating a knock signal indicative of the presence of knocking in said engine when said occurrence signal magnitude exceeds a second predetermined reference signal.

3. Apparatus for detecting engine knocking comprising:
   means for monitoring vibrations of an internal combustion engine during the rotation of said engine;
   means for sampling, during a predetermined interval close to the top dead center position of a piston of said engine, a peak magnitude of said monitored vibrations;
   means for counting a predetermined number of rotations of said engine;
   means for accumulating said sampled peak magnitude; for said predetermined number of rotations;
   means for dividing said accumulated peak magnitude by said predetermined number of rotations to derive an average peak magnitude of vibrations;
   means for dividing each of said sampled peak magnitude by said average peak magnitude to derive a magnitude ratio of each of said sampled peak magnitude relative to said average peak magnitude;
   means for comparing each of said magnitude ratio with a predetermined reference ratio to produce a comparison output indicative of said magnitude ratio being in excess of said predetermined reference ratio;
   means for counting a number of said comparison output;

means for dividing said counter number of said comparison output by said predetermined number of rotations to derive an average counter number; and means for generating a knock signal indicative of the presence of knocking in said engine when said average counted number exceeds a predetermined value.

4. Apparatus for detecting engine knocking comprising:

means for monitoring vibrations of an internal combustion engine during the rotation of said engine;

means for integrating, during a predetermined interval close to the top dead center position of a piston of said engine, a magnitude of said monitored vibrations;

means for counting a predetermined number of rotations of said engine;

means for accumulating said integrated magnitude for said predetermined number of rotations;

means for dividing said accumulated magnitude by said predetermined number of rotations to derive an average magnitude of vibrations;

means for dividing each of said integrated magnitude by said average magnitude to derive a magnitude ratio of each of said integrated magnitude relative to said average magnitude;

means for comparing each of said magnitude ratio with a predetermined reference ratio to produce a comparison output indicative of said magnitude ratio being in excess of said predetermined reference ratio;

means for counting a number of said comparison output;

means for dividing said counted number of said comparison output by said predetermined number of rotations to derive an average counted number and means for generating a knock signal indicative of the presence of knocking in said engine when said average counted number exceeds a predetermined value.

* * * * *